(12) United States Patent
Taylor

(10) Patent No.: US 6,535,127 B1
(45) Date of Patent: Mar. 18, 2003

(54) PANIC ALERT FOR CELLULAR TELEPHONE

(75) Inventor: Elizabeth Anne Taylor, Atlanta, GA (US)

(73) Assignee: Motorola, Inc., Schaumburg, IL (US)

( * ) Notice: Subject to any disclaimer, the term of this patent is extended or adjusted under 35 U.S.C. 154(b) by 60 days.

(21) Appl. No.: 09/693,067

(22) Filed: Oct. 20, 2000

(51) Int. Cl.⁷ ................................................ G08B 13/14
(52) U.S. Cl. ................. 340/571; 340/573.1; 340/691.1; 340/321
(58) Field of Search ............................... 340/571, 573.1, 340/691.1, 321

(56) References Cited

U.S. PATENT DOCUMENTS 6,044,257 A    3/2000  Boling et al.
6,239,700 B1 * 5/2001  Hoffman et al. ............ 340/539

* cited by examiner

*Primary Examiner*—Daryl Pope
(74) *Attorney, Agent, or Firm*—Philip H. Burrus, IV

(57) ABSTRACT

An integrated electronic apparatus includes a personal electronic device other than a personal alarm. A personal alarm is integrated with the personal electronic device. A battery is electrically coupled to the personal electronic device and the personal alarm so as to provide electric power to both the personal electronic device and the personal alarm.

4 Claims, 1 Drawing Sheet

PANIC ALERT FOR CELLULAR TELEPHONE

BACKGROUND

1. Field of the Invention

The present invention relates to personal electronic devices and, more specifically, to a personal electronic device that includes a personal alarm.

2. Description of the Prior Art

Cellular telephones, two-way radios, pagers, personal data assistants, calculators, and voice recorders/players are only some of the personal electronic devices carried by individuals in today's mobile society. Many individuals also carry some form of protection to guard against personal attack. Examples of such protection includes mace, pepper spray, or sound producing devices such as whistles or personal alarms. However, these personal protection devises only add to the number of devises carried by individuals. Carrying several personal electronic devices in addition to personal protection devices may be awkward and cumbersome.

Therefore, a need exists for a personal alarm integrated with a personal electronic device.

DETAILED DESCRIPTION OF THE INVENTION

Figure 1:
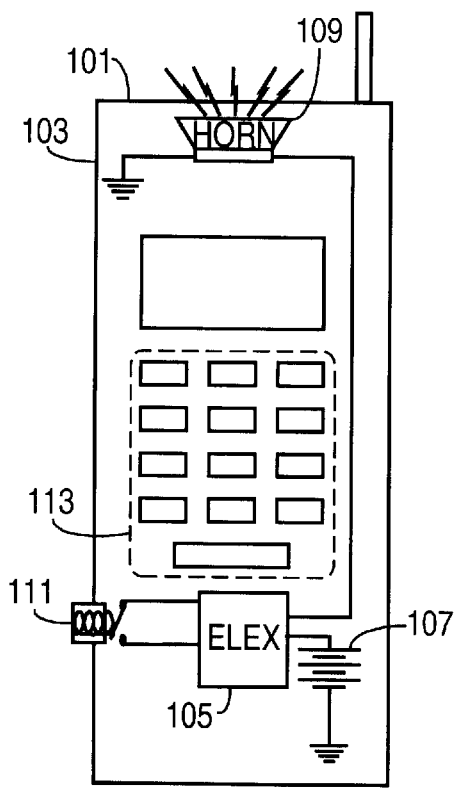
FIG. 1 is a schematic diagram of a first embodiment of the invention in which a personal alarm is integrated with a personal electronic device.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of a personal electronic device includes a cellular telephone 101 having a body 103 securing the electronic circuitry 105 necessary to operate the telephone. The electronic circuitry 105 may be mounted on a printed circuit board, flexible circuit assembly, or similar connecting means. The electronic circuitry 105 may include charging circuitry, including switch mode regulators like buck regulators, fly-back power supplies, and resonant power supplies, as well as linear power regulators for tapering, stepping, or ramping voltage and current. A battery 107 is electrically coupled to and provides power for the electronic circuitry 105. The battery 107 is also electrically coupled to and provides power for a personal alarm 109.

In one preferred embodiment, a personal alarm 109 is integrated in the body 103 of the cellular telephone 101. The mounting may be via insert molding, where the personal alarm and housing become a single unit. Additionally, adhesives, snaps or screws may be used to mechanically connect the personal alarm 109 to the housing. The personal alarm 109 is preferably a device designed to emit a loud, audible tone. A preferred embodiment includes an acoustic speaker as the personal alarm that emits a shrill tone similar to that emitted by a smoke detector. It is clear that the invention is not so limited, however, in that alternative alarms could equally be used. For example, the alarm may send a radio-frequency (RF) transmission to the authorities via a 911 number. The alarm may emit a bright light, an offensive odor, or a gas of mace, pepper spray, or other skin irritants. The personal alarm could activate a taser capable of shocking attackers.

In one embodiment, the alarm 109 is activated by closing a switch 111 that causes the electronic circuitry 105 to apply a voltage to the horn 109. In an alternative embodiment, an predetermined sequence of telephone input keys 113 could be used to activate the horn 109. In yet another embodiment, an owner of a cellular telephone could call the number of the cellular telephone from a remote telephone and enter a predetermined sequence of keys to activate the horn 109, thereby providing a theft deterrence.

Figure 2:
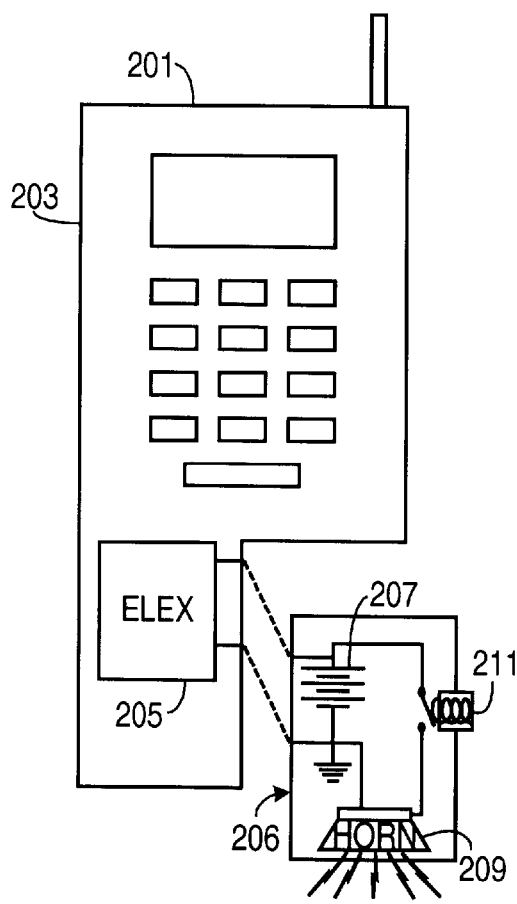
FIG. 2 is a schematic diagram of a second embodiment of the invention in which a personal alarm is integrated with a battery.

FIG. 2 shows a second embodiment in which a cellular telephone 201 includes a body 203 securing the electronic circuitry 205 necessary to operate the telephone. A detachable battery unit 206 includes a battery 207 that provides power to the electronic circuitry 205 and a personal alarm 209. In this embodiment the personal alarm 209 is integrated with the battery 207, rather than the body 203 of the cellular telephone 201. The horn 209 is activated by closing a switch 211 on the detachable battery unit 206. Personal alarms other that horns, including those described above, could equally be used.

In alternative embodiments, the personal electronic device may be a pager, a personal data assistant, a voice recorder, a digital watch, or a calculator.

The above described embodiments are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. An integrated electronic apparatus, comprising:
   a. a personal electronic device other than a personal alarm;
   b. a personal alarm; and
   c. a detachable battery electrically capable of coupling to the personal electronic device so as to provide electric power to the personal electronic device;
   wherein the personal alarm is disposed within the detachable battery; and
   wherein the personal alarm may be actuated regardless of whether the detachable battery is coupled to the personal electronic device.

2. The apparatus in claim 1, wherein the personal electronic device is a cellular telephone.

3. The apparatus in claim 1, wherein the personal electronic device comprises a pager.

4. The apparatus in claim 1, wherein the personal electronic device comprises a cellular telephone that includes a circuit programmed to cause the personal alarm to be activated when the cellular telephone is called from a remote telephone at which a predetermined sequence of keys is entered.

* * * * *